Aug. 27, 1929.  E. LÖW  1,726,401
PRODUCTION OF CONCENTRATED ACETATE LIQUORS
FROM ACETIC ACID CONTAINING GASES
Filed Jan. 26, 1927
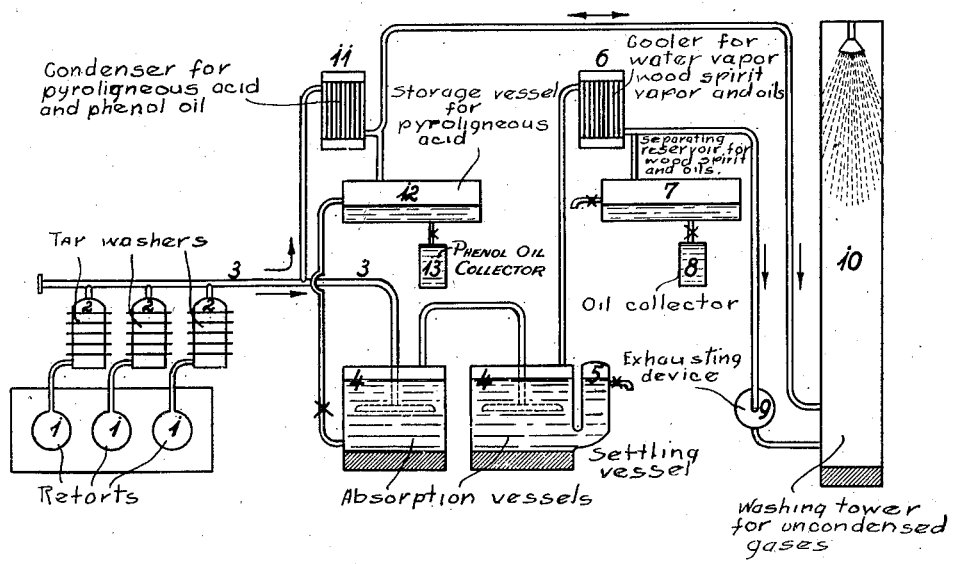
Inventor:
Eduard Löw
By [signature]
Attorney Patented Aug. 27, 1929.

1,726,401

UNITED STATES PATENT OFFICE.

EDUARD LÖW, OF MAINZ-MOMBACH, GERMANY, ASSIGNOR TO VEREIN FÜR CHEMISCHE INDUSTRIE AKTIENGESELLSCHAFT, OF FRANKFORT-ON-THE-MAIN, GERMANY, A GERMAN CORPORATION.

PRODUCTION OF CONCENTRATED ACETATE LIQUORS FROM ACETIC ACID CONTAINING GASES.

Application filed January 26, 1927, Serial No. 163,817, and in Germany February 4, 1926.

In the direct production of acetates from the acetic acid-containing vapours of the retort gases from wood-carbonization, difficulties arise because the retorts deliver very irregular quantities of distillation products in different working periods. The absorption apparatus is thus sometimes overcharged and sometimes insufficiently charged.

This disadvantage may be overcome to a certain extent if the vapours from several retorts charged at different times are conducted to a collecting conduit so that an equalizing effect is obtained.

The operation of the absorption vessels or absorption towers is nevertheless still very irregular so that the concentration of the acetate solutions in the said absorption vessels or towers changes suddenly. Consequently the absorption vessels are never operated continuously and are never caused to run with a concentrated acetate solution, but the absorption vessels charged with the necessary milk of lime or soda solution are put in operation periodically, the absorption being interrupted when the lime or soda is used up. Saturated solutions of acetate cannot be produced in this manner. The further treatment of these acetate liquors requires therefore the expenditure of a considerable amount of fuel.

The present invention provides a continuous process for the production of concentrated calcium acetate liquors. According to the process of this invention a regulated quantity of acetic acid vapours and a regulated quantity of pyroligneous acid are introduced continuously into the absorption apparatus. A sudden alteration of the concentration of the calcium acetate solution in the absorption vessels cannot occur and it is possible therefore to proceed without danger almost to the saturation condition of the solution.

Other features of the invention will be referred to as the description proceeds.

The process will now be described in further detail with reference to the plant illustrated by way of example in the drawing.

The gases and vapours pass from the retorts 1 into tar-washers 2 and thence into the collecting conduit 3. The gas-vapour mixture is here separated into two parts.

A regulated current forming one part is drawn by the exhausting device 9 through the absorption vessels 4. The latter contain a hot solution of calcium acetate and are charged with a sufficient quantity of calcium hydrate; in addition a controlled quantity of pyroligneous acid is introduced thereto, being taken from the quantity collecting in the storage vessel 12. The pyroligneous acid condensed in the cooler 11 may be saturated before its introduction into the absorption vessels 4—that is, outside the same—with lime or calcium carbonate, and the aqueous solution of calcium acetate may be introduced into the absorption vessels in place of the aqueous acetic acid. If too concentrated calcium acetate solution should form in the absorption vessels it is naturally also possible to add water in place of the pyroligneous acid. Dilute calcium acetate liquors resulting from the operation of the filter presses for the calcium acetate liquors are occasionally introduced into the absorption vessels in place of pyroligneous acid. The acetic acid vapours introduced and the pyroligneous acid added are neutralized in the absorption vessels, while the water vapour, the vapours of the wood-spirit and the oils escape to the cooler 6 and are there liquefied. The condensate flows to the reservoir 7 wherein the oils separate and pass to the vessel 8. The uncondensed retort gases are forced by the exhausting device 9 to the washing tower 10 where they are washed. If the operation of the absorption vessels is appropriately regulated, an almost saturated solution of calcium acetate flows therefrom. The said solution passes first to the settling vessel 5 and is conducted thence to the storage vessels.

The second part of the retort vapours, which is not acted upon by the exhausting device, flows freely to the cooler 11. The quantity flow per hour of the said divided-off part of the retort vapours varies considerably in accordance with the operation of the retorts. Sometimes it lies considerably above the average value and sometimes considerably below. The liquid (pyroligneous acid and phenol oil) condensed in the cooler 11, collects in the storage vessel 12, the phenol oil separating from the pyroligneous acid and passing to the vessel 13. The uncondensed gases escape to the washing tower 10.

The storage vessel 12 serves as a compensating vessel in view of the irregular operation of the retorts. A controlled quantity of pyroligneous acid is allowed to flow continuously therefrom to the absorption vessels 4.

By suitably altering the quantities of vapour and gas drawn by the exhausting device into the absorption vessels 4, it is possible to produce acetate solutions of various concentrations in these vessels. In any case the operation will be carried on as nearly as is technically possible to the saturation limit of the liquors. In charging the absorption vessels with calcium hydrate a considerable excess thereof is preferably avoided. Calcium carbonate or soda or other metal carbonates or hydroxides may also be employed in place of calcium hydrate. The acetic acid may be absorbed from the vapours in a particularly advantageous manner if the previously mentioned calcium carbonate, in a more or less finely divided condition, is maintained in suspension in water or aqueous calcium acetate solution. Milk of lime, employed hitherto for the absorption of acetic acid, does not yield concentrated solutions of calcium acetate so readily as is the case with finely divided calcium carbonate maintained in suspension. A further advantage over the use of milk of lime is that the absorption of the acetic acid takes place in neutral solution, so that action of caustic lime on the other constituents of the vapours is avoided. Even leading the vapours containing acetic acid through towers filled with calcium carbonate in lumps does not achieve the result mentioned, because the lumps of limestone become continually smaller due to to corrosion and block up the towers, and because the acetic acid vapours are fixed incompletely only by the lime in lumps.

Calcium carbonate in amorphous condition has proved to be particularly suitable for the purpose stated. The by-product, so-called "acetone ash", resulting from the heating of the calcium acetate in the preparation of acetone, may therefore be employed with advantage. Even precipitated calcium carbonate (for example saturation-sludge) or finely divided limestone (chalk) is, for the neutralizing operation, superior to the limestone in lumps.

However obvious the use of more or less finely divided calcium carbonate for the stated purpose may be in itself, such carbonate has not been employed for that purpose in technical operations hitherto, although the acetone ash, for example, constitutes a burdensome by-product in most wood-carbonization operations and is thus at disposal. Clearly it has hitherto not been recognized that the complete fixation of the acetic acid vapours can only be effected if the more or less finely divided calcium carbonate (acetone ash) is maintained in suspension in the absorption liquid.

The acetone ash or other more or less finely divided calcium carbonate is added to the acetic-acid-containing gases coming from the retorts or blowers, and conducted through the absorption vessels which are charged with hot water or with hot calcium acetate solution, and said ash or carbonate is maintained in suspension in the absorption liquid by suitable agitating means. Two such absorption vessels connected in series are sufficient for the complete absorption of the acetic acid if provision is made for intimate contact and mixture of the vapours with the absorption liquid. The water vapour, wood-spirit and oil vapours present do not condense in the hot absorption liquid, so that it is possible to prepare pure, concentrated solutions of calcium acetate.

If the absorption vessels are filled with an almost saturated solution of calcium acetate and are supplied continuously with acetone ash (calcium carbonate) and water or pyroligneous acid or aqueous calcium acetate solution as necessitated by the composition of the contents of the absorption vessels, then an almost saturated solution of acetate flows continuously from the absorption vessels.

What I claim is:

1. A process for the continuous production of concentrated acetate liquors from a fluctuating quantity of acetic acid-containing volatile matters arising from the carbonization of wood, which consists in dividing the gases into two streams, passing one regulated stream through hot liquid containing a neutralizing agent in an absorption plant, and the other stream through a condensation plant for recovering pyroligneous acid, and utilizing said pyroligneous acid as required for keeping constant the acetate concentration in the absorption plant.

2. A process for the continuous production of concentrated acetate liquors from a fluctuating quantity of acetic acid-containing volatile matters arising from the carbonization of wood which consists in dividing the gases into two streams, passing one regulated stream through hot liquid containing a neutralizing agent in an absorption plant, and the other stream through a condensation plant for recovering pyroligneous acid, and introducing acetate liquors derived from the condensation plant in controlled quantities into the absorption plant to replace the liquid leaving as acetate liquor.

3. A process for the continuous production of concentrated acetate liquors from a fluctuating quantity of acetic acid-containing volatile matters arising from the carbonization of wood, which consists in dividing the gases into two streams, passing one regulated stream through hot liquid carrying in suspension a finely divided calcium carbonate-containing absorption agent, and the other stream through a condensation plant for recovering pyroligneous acid, and utilizing said pyroligneous acid as required for keeping constant the acetate concentration in the absorption plant.

4. A process for the continuous production of concentrated acetate liquors from a fluctuating quantity of acetic acid-containing volatile matters arising from the carbonization of wood, which consists in dividing the gases into two streams, passing one regulated stream through hot liquid carrying in suspension a finely divided calcium carbonate-containing absorption agent, and the other stream through a condensation plant for recovering pyroligneous acid, and introducing acetate liquors derived from the condensation plant in controlled quantities into the absorption plant to replace the liquid leaving as acetate liquor.

5. A process for the continuous production of concentrated acetate liquors from a fluctuating quantity of acetic acid-containing volatile matters arising from the carbonization of wood, which consists in dividing the gases into two streams, passing one regulated stream through hot liquid carrying in suspension finely divided acetone ash, and the other stream through a condensation plant for recovering pyroligneous acid, and utilizing said pyroligneous acid as required for keeping constant the acetate concentration in said absorption plant.

6. A process for the continuous production of concentrated acetate liquors from a fluctuating quantity of acetic acid-containing volatile matters, which comprises the steps of introducing a finely divided calcium carbonate-containing liquid into the gas stream, conducting said gas stream through a heated liquid, and replacing the liquid separated off as concentrated acetate liquor by fresh quantities of acetate liquors.

7. A process for the continuous production of concentrated acetate liquors from a fluctuating quantity of acetic acid-containing volatile matters, which comprises the steps of introducing a finely divided calcium carbonate-containing liquid into the gas stream, conducting said gas stream through an almost saturated heated solution of calcium acetate in an absorption plant, and replacing the liquid taken off from said absorption plant as concentrated acetate liquor by fresh quantities of aqueous acetate liquors.

8. A process for the continuous production of concentrated acetate liquors from a fluctuating quantity of acetic acid-containing volatile matters arising from the carbonization of wood, which consists in dividing the gases into two streams, passing one regulated stream through hot liquid containing a neutralizing agent in an absorption plant, and the other stream through a condensation plant for recovering pyroligneous acid, neutralizing the condensed pyroligneous acid, and introducing the dilute acetate liquor obtained by such neutralization in controlled quantities into the absorption plant to replace the liquid leaving as concentrated acetate liquor.

9. A process for the continuous production of concentrated acetate liquors from a fluctuating quantity of acetic acid-containing volatile matters arising from the carbonization of wood, which consists in dividing the gases into two streams, passing one regulated stream through hot liquid carrying in suspension a finely divided calcium carbonate-containing absorption agent, and the other stream through a condensation plant for recovering pyroligneous acid, neutralizing the condensed pyroligneous acid, and introducing the dilute acetate liquor obtained by such neutralization in controlled quantities into the absorption plant to replace the liquid leaving as concentrated acetate liquor.

In testimony whereof I have signed my name this 15th day of January, 1927.

EDUARD LÖW.